Sept. 19, 1933.     A. T. POTTER     1,927,071
CONTROL MEANS FOR WINDSHIELDS
Filed July 20, 1931
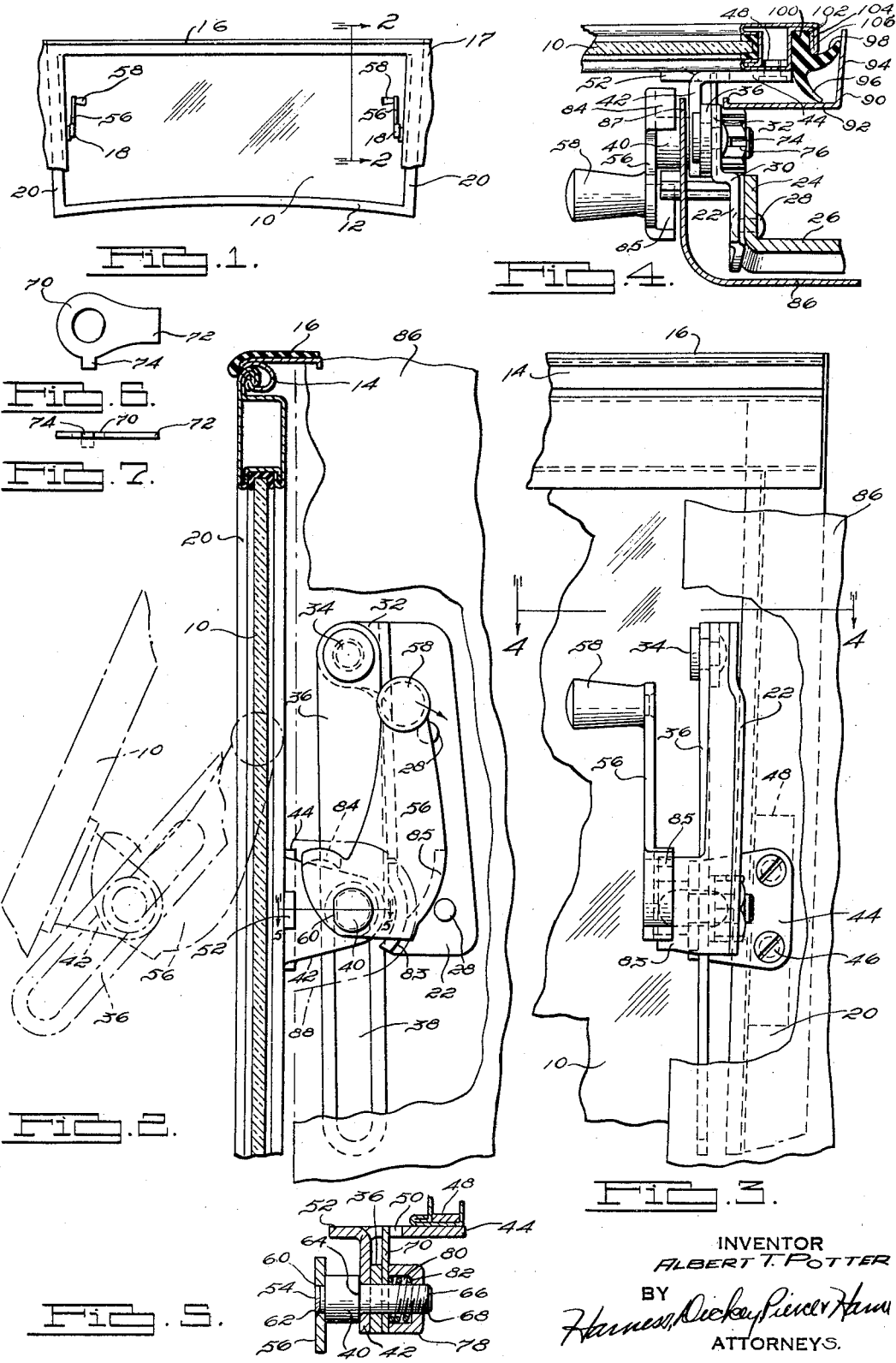
INVENTOR
ALBERT T. POTTER
BY
ATTORNEYS.

Patented Sept. 19, 1933

1,927,071

UNITED STATES PATENT OFFICE 1,927,071

CONTROL MEANS FOR WINDSHIELDS

Albert T. Potter, Detroit, Mich., assignor to Ainsworth Manufacturing Corporation, a corporation of Michigan Application July 20, 1931. Serial No. 551,823

12 Claims. (Cl. 296—84)

My invention relates to windshield regulating devices and it has particular relation to devices for maintaining windshields of the tiltable type in their various positions of angular adjustment. The invention has for its main objects the provision of a windshield regulating device of the above indicated character which is provided with means for loosening the windshield from its seat in the initiation of outward swinging movement thereof; the provision of a windshield regulating device which affords adequate mechanical advantage for urging the windshield into engagement with its seat upon closure thereof; the provision of a windshield regulating device which may be operated securely to clamp the windshield in any desirable position of angular adjustment; the provision of a windshield regulating device embodying resilient means for temporarily clamping the windshield in predetermined position; the provision of a regulating device for tiltable windshields in which all working parts except a handle are normally concealed; the provision of a regulating device for tiltable windshields in which there are no parts projecting across the front doorway in any position; the provision of a windshield regulating device which may be operated with a minimum of effort on the part of the operator, which is durable in construction and which may be manufactured at a minimum of expense. These and other objects will be apparent from consideration of the appended specification and accompanying drawing.

In one conventional type of windshield structure for automotive vehicles, the windshield frame is hinged at its upper edge to the corresponding edge of the windshield opening adjacent to the forward end of the vehicle roof. The edges of such windshields are normally sealed by means of a suitable rubber weatherstrip and the windshields are maintained in predetermined positions of adjustment by means of a link hinged at one end to the front post of the vehicle body and at the other end to the side portions of the windshield frame. One of the hinged connections normally embodies a slot extending longitudinally of the link and receiving a screw threaded pin having a wing nut whereby the link may be clamped at any desired point of its length for purposes of securing the windshield in a preferred position of adjustment.

This construction is objectionable because the rubber weatherstrips about the frames frequently stick to the margins of the windshield openings and as a result the application of considerable force is necessary to unseat the windshield and thus to permit outward swinging of the latter. The conventional windshield regulator does not embody means for applying the necessary initial force for breaking the windshield from its seat and accordingly it is usually necessary for the operator to unseat the adhering members by striking the windshield a relatively sharp blow with his hand. This obviously is objectionable particularly to women drivers.

The conventional structure is also objectional because it does not include means for firmly and securely pressing the windshield into engagement with the seat in order to prevent the entrance of water about the edges thereof and further because the conventional wing nuts employed for clamping the regulating links in various positions of adjustment do not afford adequate mechanical advantage to permit proper clamping action upon the link without the exertion of excessive force upon the part of the operator. Similarly, release of the nuts after they have been tightened necessitates the expenditure of excessive efforts. Furthermore, in the conventional construction the adjustable links are normally exposed and the rear ends thereof may in certain positions project partially across the doorway and constitute a hazard to passengers entering or leaving the vehicle.

This invention contemplates the provision of a windshield regulator including cams affording great mechanical advantage for unseating and reseating the windshield, and further including a crank which functions both as means for operating the cams and as means for readily operating a clamping nut for engaging the regulating link, whereby the above indicated defects of the slotted link windshield regulator are substantially overcome. The mechanism is also so arranged that all parts except a small handle are concealed and there is no possibility of them obstructing the front door way.

For a better understanding of the invention reference may now be had to the appended specification and accompanying drawing, in the latter of which Figure 1 is an elevational view of a windshield in connection with which my invention may be employed.

Fig. 2 is a fragmentary cross sectional view taken substantially upon the line 2—2 of Fig. 1 with certain portions of the sheathing structure broken away for purposes of more adequately disclosing the windshield regulating mechanism.

Fig. 3 is a fragmentary rear elevational view of the regulating device.

Fig. 4 is a fragmentary cross sectional view substantially upon the line 4—4 of Fig. 3.

Fig. 5 is a cross sectional view taken substantially upon the line 5—5 of Fig. 2.

Fig. 6 is a plan view of a lock washer employed in connection with the windshield regulator clamping mechanism.

Fig. 7 is an elevational view of the washer disclosed in Fig. 6.

In practicing the invention a windshield structure embodying a glass panel 10 and a marginal frame 12 therefor of conventional construction is hinged by means of a conventional hinge structure indicated at 14 to the upper frame portion 16 of a vehicle body 17 about the windshield opening. Windshield regulating devices indicated generally as at 18 preferably of identical design are secured to each end portion 20 of the windshield frame.

Each of these devices includes a vertical plate 22 secured to a forwardly extending flange 24 of the front body post 26 by means of rivets 28. As best shown in Fig. 4, the plate 22 is formed with a laterally offset shoulder 30 and a forwardly projecting lug portion 32 (shown in Fig. 2) the latter of which is bored to receive a hinge pin 34 upon which the closure regulating link 36 is hingedly mounted.

As best shown in Fig. 2 the lower extremity of the link is slotted at 38 to receive a second hinge pin 40 that extends through a rearwardly extending bracket 42 having a laterally extending flange 44. The latter is secured to an end portion 20 of the windshield frame by means of screws 46 extending through the hollow walls of the frame and engaging a fish plate 48 therewithin. Bracket 42 and link 36 are so proportioned and disposed that the end of the link will clear the glass 10 at all times. As best shown in Fig. 5 the flange 44 is formed with a slotted portion 50 and the metal therefrom is bent laterally as indicated at 52 for a purpose which is later to be described.

The pin 40 is formed with a boss portion 54 adjacent to its inner end and a crank arm 56 having a handle 58 is mounted thereupon. The boss is formed with a flattened portion 60 which functions as a key to prevent rotation between the arm 56 and the pin 40 and, further, the boss is upset as indicated at 62 to prevent axial displacement of the crank arm therefrom. The pin is also formed with a shoulder 64 rotatably bearing against the inner face of the bracket 42 and a reduced stem portion 66 extends through the brackets and also through the slot 38 in the link 36 and is provided at its outer extremity with a screw threaded portion 68. A washer 70 slidably mounted upon the portion 66 is provided at its extremity with a downwardly projecting lug 72 which extends within the opening 50 in the base portion of the bracket 42 thereby to prevent rotation of the washer about the portion 66.

A lug 74 which extends laterally as shown in Figs. 4 and 7, to engage a groove 76 formed in a lateral face of a polygonal lock nut 78, thus to prevent rotation of the latter. The nut is threaded upon the stem 66 of the pin 40 and is provided with a cavity 80 which receives a compression spring 82 that bears at one end against the outer end of the cavity and at the other end resiliently engages the adjacent faces of the washer 70 whereby to urge the latter into engagement with the face of the link 36.

It is to be understood that the threads of the nut 78 are of such pitch as to produce proper clamping action upon rotation of the nut approximately one quarter of a turn.

As best shown in Fig. 2, the forward edge of the plate 22 is formed with an inwardly extending curvilinear cam lug 83 disposed approximately concentric with the pin 40 when the windshield is closed. This cam is engaged interiorly upon rotation of the lever 56 to release the nut 78 by a second arcuate cam lug 84, the cord of which extends at right angles to the lever upon the lever 56 whereby to urge the windshield away from its seat. A third arcuate cam 85 is formed upon the arm 56 adjacent to the lower end and the cord thereof extends at such angle to the axis of the arm that the initial movement of the arm 56 during rotation of nut 78 to clamp link 30 in vertical position is effective to draw the windshield into seating position.

As best shown in Fig. 4 the inner face of the body post 26 is sheathed by a plate 86 having a marginal portion 87 forwardly bent and extending between the lever 56 and the link 36 to provide a housing about the latter when the windshield is closed. It is of course, to be understood that the forward edge of this flange is notched as indicated at 88 in Fig. 2 to permit the rearward movement of the pin 40 adequate to bring the windshield into engagement with the seating portion, about the opening therefor. The seat for the windshield includes a metallic plate 90 extending about the body post 26 and being provided with an inwardly extending flange 92 and an outwardly extending shoulder 94 which respectively engage flanges 96 and 98 of a rubber weatherstrip 100. The latter is disposed in a channel formed at the outer margin of the windshield by reflexly bending portions 102 and 104 to provide a laterally extending flange of double thickness and then rearwardly bending a portion 106 of the flange to provide the channel, for the reception of the base portion of the weatherstrip 100.

The operation of my improved windshield regulating mechanism may be described as follows. It will be assumed that the windshield is in retracted position with the flanges 96 and 98 of the weatherstrip 100 in engagement with the corresponding seating portions 92 and 94 of the sheathing plate 90. In this position of the windshield the regulator link 36 will be disposed vertically and the crank arm 56 will be disposed substantially parallel thereto with the handle portion 58 uppermost.

In this position the nut 78 will be firmly drawn against the washer 70 to cause the latter to clamp the link 36 against the face of the bracket 42 thus firmly securing the windshield in closed position. If it is desired to open the windshield the operator grasps the handle 58 and rotates the lever 56 downwardly thereby rotating the pin 40 and releasing the inner face of the nut 78 from engagement with the washer 70. It will be understood that although the washer and nut are thus disengaged that the spring bearing upon the washer will cause the latter to continue to exert a moderate force against the face of the link 36 in such manner as to hold the windshield at least temporarily in a desired position of adjustment. However, the frictional engagement between the washer and the link may be overcome by the exertion of a moderate force against the windshield.

It will also be understood that initial rotation of the lever 56 brings the cam 84 into engagement with the cam 83 and as rotation is continued the force of the cam 84 against the cam 83 causes the windshield to be swung forwardly to a slight degree in order to disengage the weatherstrip 100 from corresponding sealing portions 92 and 94. Because of the shape of the cams and also because of the great length of the lever 56, the operator obtains a great mechanical advantage which permits the breaking of the seal of the weatherstrip with but comparatively slight effort. Obviously, after this seal is once broken the windshield swings outwardly under a relatively slight pressure upon the part of the operator.

When the windshield has been pushed outward the desired degree the operator rotates the lever 56 upwardly to a position approximately parallel to the face of the windshield thereby causing the pin 40 to rotate and thus to draw the nut 78 inwardly against the washer 70 thereby firmly clamping the links 36. Obviously, during use the thread of the nut 78 and the screw portion 66 tend to wear away and as a result the handle 58 is permitted to swing farther and farther toward the glass before clamping engagement of the nut 78 occurs. In order to prevent actual contact of the handle with the glass the cam 84 is so disposed as to engage the upper edge of the bracket 42, thus limiting the upward movement of the arm. Obviously, if the screw threads become so worn as to prevent proper clamping action by the nut, the lug 74 may be sprung from the groove 76 to permit the nut 78 to be rotated a slight degree after which the lug may again be swung into position in another of the slots 76.

When it is desired to close the windshield the operator merely again grasps the handle 58 and rotates the lever 56 downwardly, thus disengaging the nut 78 from the washer 70. Downward movement of the handle is limited by reason of the engagement of the lower extremity of the cam 83 with the tongue 52 which has previously been referred to. After the arm 36 has been unclamped and the windshield swung backwardly approximately into engagement with the seating portions 92 and 94 the arm 56 is rotated upwardly thereby causing the surface of the cam 83 to engage the outer cam 85, thus drawing the windshield inwardly and effecting a secure seal between the flanges 96 and 98 of the weatherstrip and the mating portions of the seating member 90.

In conclusion, it may be reiterated that my improved windshield regulating device, including the crank arm 56, provides a powerful device for securely clamping the windshield regulating links 36 in any desired position. The cams 83, 84 and 85 constitute highly efficient means for initially unseating the windshield and further for bringing the weatherstrip thereof into firm engagement with the mating flanges. In view of the great mechanical advantage afforded by the applicant's construction in the various operations involved in regulating the windshield, the latter may be operated with comparatively slight effort. The construction is extremely simple in character and inexpensive to manufacture. For these reasons it is highly desirable from a commercial viewpoint. By reason of the fact that the adjusting links have their slotted ends attached to the windshield, all portions of the links are at all times maintained forwardly of the front door opening. Furthermore, when the windshield is in closed position all working parts of the regulators except the handles 56 are concealed by the sheathing elements 86—87, thus materially enhancing the appearance of the car.

Although I have shown and described only the preferred embodiment of the invention, it is to be understood that various modifications and changes may be made therein without departure from the spirit of the invention or the scope of the appended claims.

I claim:

1. In combination, a vehicle body having an opening for a windshield therein, a windshield hingedly mounted within the opening, an adjusting link interconnecting a fixed portion of the body and the windshield, the link having a pivoting sliding connection at one end and a pivotal connection at the other, and separate crank and abutment means for initially unseating the windshield, one of said means being disposed on the windshield and the other disposed on the vehicle body.

2. A windshield regulating device comprising a link hingedly connected to a bracket at one end and having a slot at the other end slidably and pivotally engaging a screw threaded member, a lever arm for rotating the screw threaded member and abutment means on the arm engaging a second abutment for unseating the windshield.

3. A windshield regulating device comprising a link hinged at one end to a bracket adapted to be secured to a vehicle body and having a slot at the other end hingedly and slidably engaging a pin secured to the windshield frame, said pin being screw threaded and having a clamping nut thereon for locking the link in any desired position of adjustment, a lever arm for rotating said pin, the arm having a cam thereon engaging a second cam secured to the vehicle body for forcing the windshield outwardly.

4. A windshield regulating device comprising a link hinged at one end to a bracket adapted to be secured to a vehicle body, said link having a slot at the other end hingedly and slidably engaging a pin secured to the windshield frame, said pin being screw threaded and having a clamping nut thereon for locking the link in any desired position of adjustment, a lever arm for rotating said pin, the arm having a cam thereon engaging a second cam secured to the vehicle body for forcing the windshield outwardly and a third cam adapted to be engaged when the windshield is approximately in closed position for firmly drawing the latter into engagement with the two portions of the vehicle body.

5. A windshield regulating device comprising a link hinged at one end to a bracket adapted to be secured to a portion of the vehicle body and having a connection at the other end permitting sliding and pivotal movement with respect to a windshield frame, a crank arm connected to the windshield frame and adapted to engage a portion fixed with regard to the vehicle body when the windshield is in closed position for purposes of unseating the windshield.

6. A windshield regulating device comprising a link adapted to interconnect a windshield and a vehicle body, the link being pivotally connected to the body and having a pin and slot connection with the windshield, the pin of said connection being screw threaded and having a nut thereon for clamping the link, an arm for relatively rotating the pin and the nut, said arm having cam means engaging abutment means on the vehicle body for swinging the windshield.

7. A combination as defined in claim 6 in which a stop is provided for preventing the rotatable arm from striking the windshield.

8. A windshield regulating device comprising brackets secured to a windshield and to a vehicle body, a link interconnecting the brackets, the link having a hinged connection at one end to one of the brackets, and having a slot at the other end, a screw threaded pin extending through the other bracket and the slot, a hollow clamping nut on the screw, a washer between the nut and the link, a spring within the nut actuating the washer into engagement with the link, and means preventing rotation of the nut and washer with respect to each other and with respect to the adjacent bracket.

9. In combination, a stationary frame element, a windshield element or the like pivotally connected thereto for hinging movement, a link movably connected to one of the elements and slidably connected to the other so that the shield may be opened and closed, manually operable handle means mounted on one of the elements including means adapted to cooperate with the other element to initially start opening of the windshield to overcome binding, and to draw the shield into a tightly closed position during final closing movement, upon movement of the handle alternately between certain positions, and means cooperatively connecting such manually operable means with the link so that upon moving the handle to that position causing initial opening of the shield, the link will be free to move and hence the shield may be opened completely without further or other movement of the handle.

10. In combination, a stationary frame element, a windshield element or the like pivotally connected thereto for hinging movement, a link movably connected to one of the elements and slidably connected to the other so that the shield may be opened and closed, manually operable handle means mounted on one of the elements including means adapted to cooperate with the other element to initially start opening of the windshield to overcome binding, and to draw the shield into a tightly closed position during final closing movement, upon movement of the handle alternately between certain positions, and means cooperatively connecting such manually operable means with the link so that upon moving the handle to that position causing initial opening of the shield, the link will be free to move and hence the shield may be opened farther without further or other movement of the handle, the means operatively connecting the link to the manually operable means being of such character that after partial or complete opening of the shield, with the handle in the last mentioned position, a movement of the handle to its other position will lock the shield in such open position.

11. In combination, a stationary frame, a windshield or the like pivoted in the frame for hinging movement, a link movably connected to one element and having slidable engagement with the other so that the shield may be opened and closed, a handle operated mechanism connected to one of the elements and cooperatively connected to the link that upon moving the handle to one position, the shield, link and stationary frame are locked together and upon moving the handle to another position, the windshield and link are free to move, and means operatively forming a part of the handle operated means and adapted to cooperate with that element other than the one upon which the manually operable means is mounted, for causing initial opening of the windshield after it is closed, upon moving the handle to that position in which the shield is free to be moved, and for drawing the shield from substantially closed position into tightly closed position when the handle is moved to its other position.

12. In combination, a stationary frame element, a windshield element or the like pivotally connected thereto for hinging movement, a link pivotally connected to one of the elements and having a slot at its other end extending longitudinally thereof, a pin on the other element projecting into the slot in the link, a crank mounted on the pin, means for releasing or holding the slotted portion of the link with respect to the pin upon turning of the crank from one position to another, so that the shield may be held in any adjusted or closed position, or released for hinging movement by turning the crank, abutment means on that element other than the one on which the pin is mounted, and means on the crank and cooperating with the abutment means when the shield is in or adjacent its closed position, for unseating the shield or drawing it to tightly closed position, when the crank is turned to its link-releasing position or to its link-holding position, respectively.

ALBERT T. POTTER.